Figure 1:
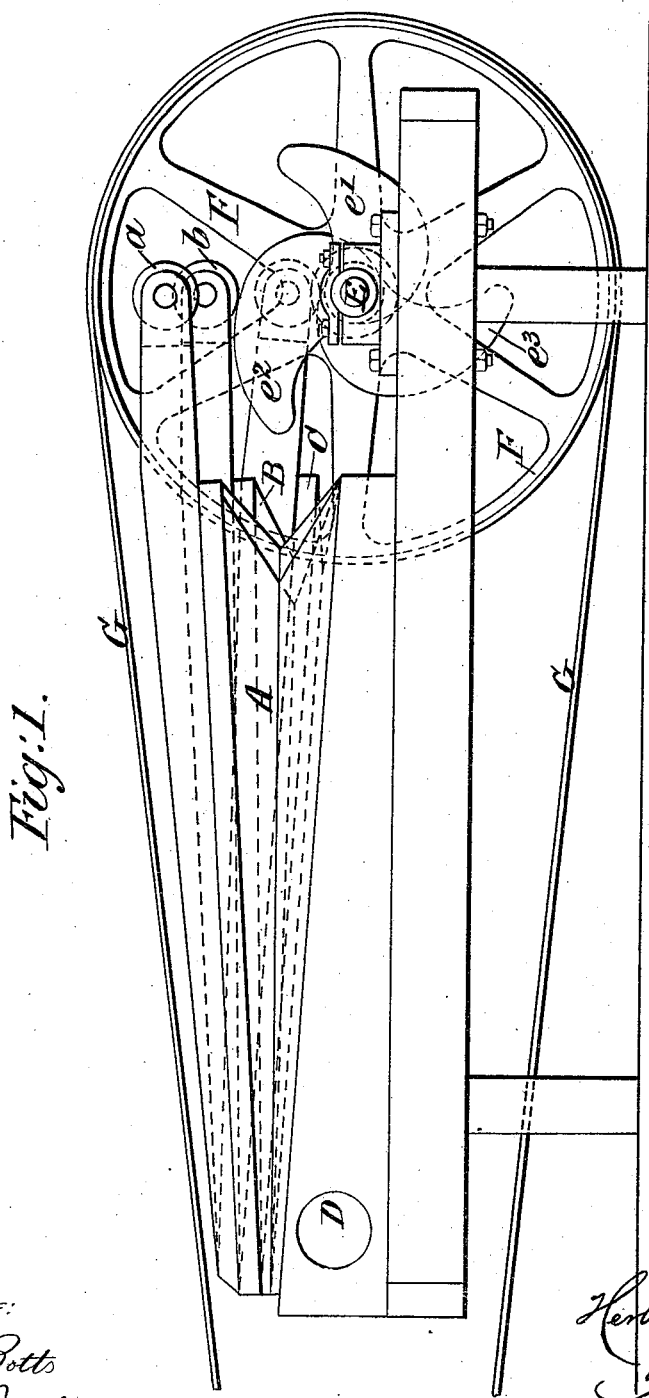

(No Model.)
2 Sheets—Sheet 1.

H. DAVIS.
APPARATUS FOR EXHAUSTING OR DELIVERING AIR OR OTHER FLUID UNDER PRESSURE.

No. 354,888.
Patented Dec. 28, 1886.

Attest:
Geo. H. Botts
A. N. Jasbera

Inventor:
Herbert Davis
by
Munem & Philipp
Atty's

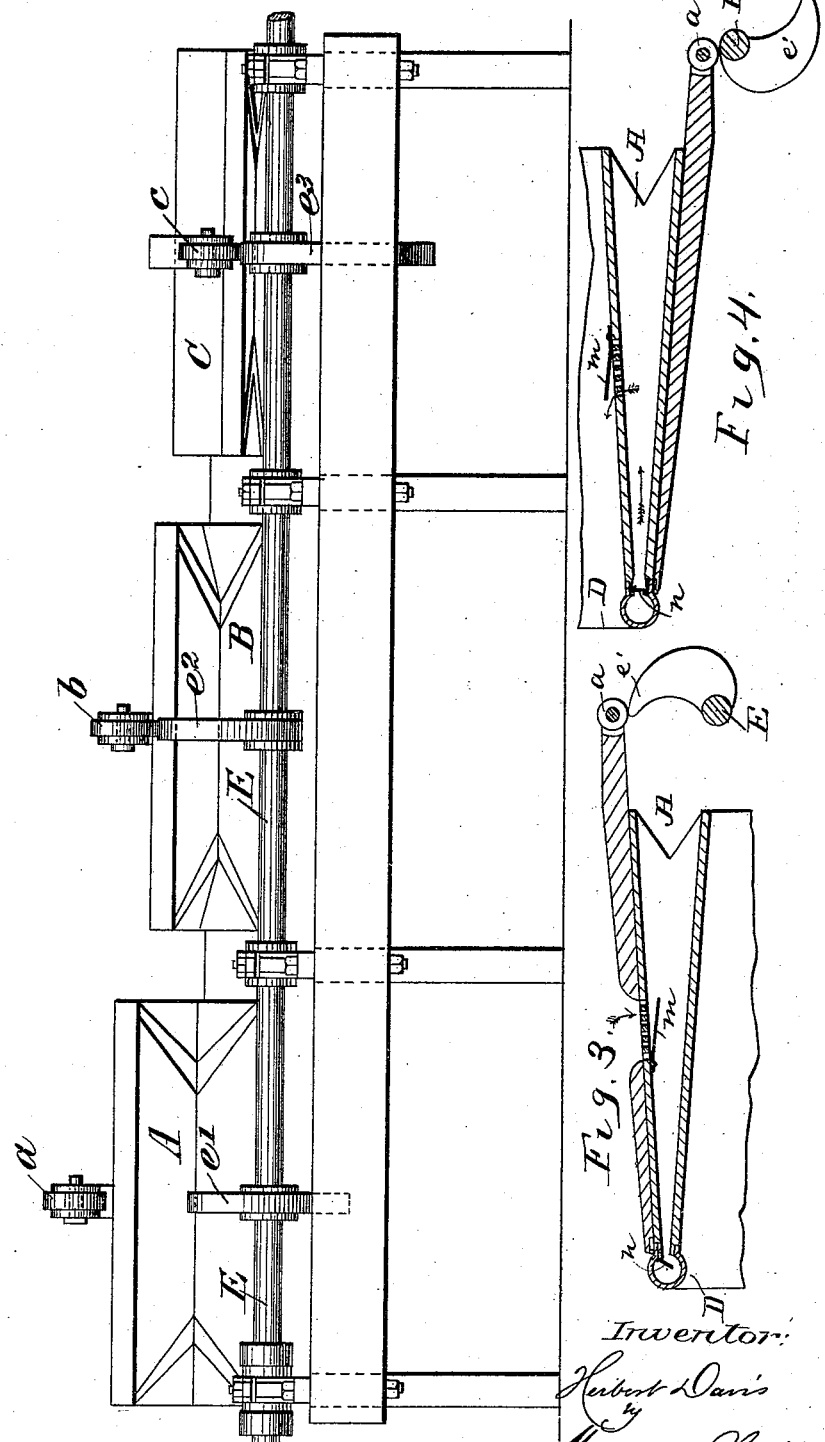

UNITED STATES PATENT OFFICE.

HERBERT DAVIS, OF DRAYTON PARK, HIGHBURY, COUNTY OF MIDDLESEX, ENGLAND.

APPARATUS FOR EXHAUSTING OR DELIVERING AIR OR OTHER FLUID UNDER PRESSURE.

SPECIFICATION forming part of Letters Patent No. 354,888, dated December 28, 1886.

Application filed March 27, 1885. Serial No. 160,156. (No model.)

*To all whom it may concern:*

Be it known that I, HERBERT DAVIS, of 48 Elfort Road, Drayton Park, Highbury, in the county of Middlesex, England, have invented certain new and useful Improvements in Apparatus for Exhausting or Delivering Air or other Fluid under Pressure, especially applicable for use with gas and other motive-power engines, of which the following is a specification.

The object of the present invention is to provide simple and efficient apparatus for exhausting or delivering air or, it might be, other fluid under pressure, which apparatus may be worked by a gas or other motive-power engine without risk of injuring the mechanism or operation of the instrument or implement with which such air pressure or exhaust may be connected, either from overblowing or over-exhausting the air.

The apparatus is especially designed to enable wind-instruments—such as organs—to be supplied with a steady and ample volume of air under the influence of cheap motors—such as hot-air or gas engines—without risk of overblowing or otherwise in the event of such engines running irregularly or working unduly fast.

To this end the invention consists in the combination, with a pipe or hollow shaft for conveying compressed or attenuated air, of a series of "feeders" or bellows which are caused to open or close in succession under the influence of a gas or other motive-power engine, and are free to collapse or expand under the influence of gravitation (aided, it may be, by weights or springs) after being thus forcibly opened or closed, respectively, for the purpose of delivering air under pressure into the said pipe or hollow shaft, and through it to the organ, or for exhausting air by the said pipe or hollow shaft therefrom.

The invention in its simplest form consists of a series of air bellows or feeders arranged in a row side by side, and each connected at one end with a pipe or hollow shaft leading to the instrument, and of a tappet-shaft adapted to be driven by a gas or other motive-power engine, and so arranged with respect to the bellows or feeders as to operate or open in succession the several bellows or feeders for the purpose of filling them with air, the air thus drawn in being discharged by them in succession into the common pipe or air-trunk leading to the organ under the influence of gravitation, aided, it may be, by a spring or weight. Such an arrangement is suitable for organs of all sizes, and is that which, for simplicity and regularity of action, is preferably adopted, though the invention may be embodied in various other combinations, which will be hereinafter referred to and claimed.

In the accompanying drawings, Figure 1 is a side elevation, and Fig. 2 a rear end view, of air-delivery apparatus constructed according to my invention. Fig. 3 is a diagrammatical central sectional elevation of one of the feeders or bellows when arranged to force air or other fluid under pressure into the hollow shaft, and Fig. 4 is a similar section of one of such feeders or bellows when arranged to exhaust air or other fluid from the hollow shaft.

A, B, and C represent three bellows or feeders (there might be more) arranged in series side by side, and adapted each to deliver air in succession into the pipe or hollow shaft D, (common to all the blowers,) by which the said air is conveyed to the instrument requiring it.

E is a tappet-shaft, the tappets $e'$, $e^2$, and $e^3$ on which, as the shaft rotates, operate in succession upon the projecting ends or lever-arms of the bellows A, B, and C, and raise them one after the other to their highest position, allowing them to fall by their own weight and expel the air which the bellows have drawn in into the pipe D.

The bellows or feeders, when arranged to force air into the hollow shaft, Figs. 1, 2, and 3, are each fitted with an air-inlet valve, as $m$, that controls a grated opening in the upper portion of the bellows, and an outlet-valve, as $n$, opening into said hollow shaft, which may be of any suitable or well-known construction; and their projecting tops or lever-arms are preferably provided with bowls $a\ b\ c$ for reducing friction, the tappets $e'$, $e^2$, and $e^3$ being so shaped as to engage gently and in succession with their respective bowls as the shaft E is rotated under the influence of the gas or other engine. These projecting tops or lever-arms in their simplest form are of such weight that upon the passage of the tappets which raise said arms and forcibly open the bellows they will fall by gravity, and thus force the air or other fluid by the valve n into the hollow shaft D.

In the arrangement of the feeders or bellows for exhausting air or other fluid from the hollow shaft, as in Fig. 4, the weighted operating lever-arm is so arranged that the bellows will be forcibly collapsed by the tappet to expel the air or other fluid by the valve m, which, when released by such tappet, will fall by gravity, thus exhausting air from the hollow shaft by the valve n, the valve m closing upon the commencement of such falling movement.

A pulley, F, and driving-belt G indicate the gearing connecting the gas or other engine with the tappet-shaft; but bevel or other gearing might be used for the purpose of transmitting motion to the shaft E, and it may be driven at any suitable speed by varying the size of the pulley or the arrangement of gear-wheels. The speed of rotation of the shaft E should be such as to allow sufficient time for the feeders or bellows to freely empty or partially empty themselves into the pipe D during the interval between each rotation of a tappet and enforced inflation, so that the demands of the organ for air-pressure may be fully met and a continuous supply of air at uniform pressure be delivered thereto.

When the organ requires but little air-pressure, the bellows will not be able to collapse so freely, but will remain practically filled with air, and in that case the only result of the continued rotation of the tappet-shaft upon them will be to maintain them in the open position, the expulsion of the air therefrom being in no way accelerated, even by the rapid working of the tappet-shaft. In this way a steady pressure of air can be maintained in the pipe D, and the organ or instrument to which it is supplied will remain unaffected and uninjured by irregularities in running of the said engine, which will enable cheap motors, whose speed is somewhat liable to variation and difficult to govern, to be used without danger to the instrument, for the purposes above set forth.

In some cases the bellows or feeders in the series may be grouped tangentially or radially upon and around a pipe or hollow shaft, instead of being arranged, as above described, in a row, and in that case they may be caused to open, to draw in air, by rotating the said pipe, instead of employing a separate rotating shaft provided with tappets, or their equivalent, for forcibly effecting such opening action of the bellows, the said bellows closing, as before, under the influence of gravitation, to expel the air they have drawn in, in opening, into the pipe or air-trunk on which they are mounted; but such an arrangement requires the bellows to be of large size and weight, and by reason of the space thus occupied is not, in general, so well adapted to the end in view as the arrangement shown in the drawings. When, however, the bellows are thus mounted on a hollow rotating shaft, it is preferable to arrange them tangentially of such shaft, as the difficulties of manufacture are not so great as when the bellows are arranged radially around the shaft.

From the foregoing it will be seen that an essential feature of my invention consists in the combination, with a series of bellows or feeders delivering air into or exhausting air from a hollow shaft or pipe common to all the said bellows, of means for forcibly operating the said bellows, to expand or collapse them in succession, in readiness for their next effective movement of collapse or expansion, as the case may be, the said effective movement, and consequently the pressure or vacuum created by them in the said pipe, being unaffected by and independent of the continued action of the motive power, and maintained solely by the influence of gravitation, aided, it may be, by weights or springs of any given force.

What I desire to claim is—

1. An apparatus for delivering air or other fluid under pressure, or for exhausting air or other fluid, the same consisting of a plurality of bellows or feeders, as A B, provided with suitable eduction and induction valves, as m n, and connected directly with a conduit or wind-trunk common to all, the delivery or exhausting of the air by the said bellows or feeders being effected solely by the action of their movable members under the influence of gravitation, the operating position of said movable members being restored from time to time, as required, by suitable mechanical means continuously driven by an irregularly-running or other prime mover, the said bellows or feeders acting to deliver or exhaust only as and when required, and independently of any actuating mechanism, whereby all strain on the bellows or feeders is avoided, as set forth.

2. In an apparatus for delivering air or other fluid under pressure, or for exhausting the same, the combination, with a plurality of bellows or feeders, as A B, connected with a conduit or wind-trunk, as D, common to all, each arranged to deliver or exhaust air by the gravitating movement of their movable members, and provided with suitable eduction and induction valves, as m n, of a plurality of cams or tappets, as $e'$ $e^2$, arranged to operate the movable members of said bellows to place the same in position to deliver or exhaust air after such gravitating movement, substantially as described.

3. In an apparatus for delivering air or other fluid under pressure, or for exhausting the same, the combination, with a plurality of bellows or feeders, as A B, connected with a conduit or wind-trunk, as D, common to all, each arranged to deliver or exhaust air in succession by the gravitating movement of their movable members, and provided with suitable eduction and induction valves, as $m$ $n$, of a plurality of cams or tappets, as $e'\ e^2$, arranged to operate the movable members of said bellows in succession, to place the same in position to deliver or exhaust air after such gravitating movement, substantially as described.

HERBERT DAVIS.

Witnesses:
    JNO. DEAN,
    G. W. WESTLEY,
        *Both of 17 Gracechurch St., London.*